US006892868B2

(12) United States Patent
Miura et al.

(10) Patent No.: US 6,892,868 B2
(45) Date of Patent: May 17, 2005

(54) ONE-WAY CLUTCH

(75) Inventors: Yoshihisa Miura, Nara (JP); Tetsuaki Numata, Nara (JP); Marc Le Calve, Cerelles (FR)

(73) Assignees: Koyo Seiko Co., Ltd., Osaka (JP); SKF France, Montigny le Bretonneux (FR)

( * ) Notice: Subject to any disclaimer, the term of this patent is extended or adjusted under 35 U.S.C. 154(b) by 0 days.

(21) Appl. No.: 10/188,360

(22) Filed: Jul. 3, 2002

(65) Prior Publication Data

US 2003/0006114 A1 Jan. 9, 2003

(30) Foreign Application Priority Data

Jul. 5, 2001 (JP) .................................... P2001-204302
Jul. 9, 2001 (JP) .................................... P2001-207277

(51) Int. Cl.[7] ................................................ F16D 41/07
(52) U.S. Cl. .................................... 192/45.1; 192/41 A
(58) Field of Search ............................. 192/45.1, 41 A; 188/82.8

(56) References Cited

U.S. PATENT DOCUMENTS

| | | | | |
|---|---|---|---|---|
| 2,744,598 A | * | 5/1956 | Troendly | 192/45.1 |
| 2,753,027 A | | 7/1956 | Troendly et al. | |
| 2,777,551 A | | 1/1957 | Banker | |
| 3,049,205 A | * | 8/1962 | Ferris et al. | 192/45.1 |
| 4,766,987 A | | 8/1988 | Message | |
| 4,854,435 A | | 8/1989 | Kitamura et al. | |
| 4,880,093 A | | 11/1989 | Message | |
| 4,882,941 A | * | 11/1989 | Kinoshita | 192/45.1 |
| 4,998,605 A | | 3/1991 | Ferris | |
| 5,000,303 A | * | 3/1991 | Shoji et al. | 192/45.1 |
| 5,002,167 A | * | 3/1991 | Kinoshita et al. | 192/41 A |
| 5,052,533 A | | 10/1991 | Carey et al. | |
| 5,335,761 A | | 8/1994 | Leitz | |
| 5,469,949 A | | 11/1995 | Leitz | |
| 6,125,978 A | | 10/2000 | Ando et al. | |
| 6,138,805 A | | 10/2000 | Kinoshita | |
| 6,167,998 B1 | | 1/2001 | Kinoshita | |
| 2004/0074730 A1 | * | 4/2004 | Miura | 195/45.1 |

FOREIGN PATENT DOCUMENTS

| | | |
|---|---|---|
| FR | 2 601 735 A | 1/1988 |
| GB | 706 947 A | 4/1954 |
| JP | 5-503343 A | 6/1993 |
| JP | 06-010233 U | 1/1994 |
| JP | 06-043370 U | 2/1994 |
| JP | 07-101057 B2 | 4/1995 |
| JP | 2555332 B2 | 9/1996 |
| JP | 2653040 B2 | 5/1997 |
| JP | 2686269 B2 | 8/1997 |
| JP | 2001-082511 | 3/2001 |

OTHER PUBLICATIONS

European Search Report dated Apr. 2, 2004.

* cited by examiner

*Primary Examiner*—Richard M. Lorence
(74) *Attorney, Agent, or Firm*—McGinn & Gibb, PLLC

(57) ABSTRACT

A one-way clutch includes a retainer (3), a spring (4) guided by the retainer, and sprags (5) which are pivotally provided in respective pockets of the retainer and respective pockets of the spring. A rounded section (4*c*) is formed on an outer diameter side of each of tongue-like flaps (4*t*) of the spring. Guide sections (3*c*, 3*c*) are formed at respective corners on one side of each pocket with respect to a circumferential direction thereof. The width (D) of a space between the guide sections is set so as to become greater than the width (T) of each of the tongue-like flaps formed in the spring, and the rounded section (4*c*) is housed in the space between the guide sections.

14 Claims, 9 Drawing Sheets

ONE-WAY CLUTCH

BACKGROUND OF THE INVENTION

The invention relates to a one-way clutch, and more particularly, to a one-way clutch in which tongue-like flaps of a spring provided on an inner diameter side of a retainer do not interfere with portions of sprags or portions of the retainer and are made greater in strength, to thereby improve engagement performance.

A one-way clutch used in an automatic transmission of an automobile is interposed between outer and inner rings, and transmission and interruption of power is effected repeatedly. As shown in FIG. 9, such a one-way clutch is usually constituted by sprags 15, a retainer 13, and a spring 14, and is placed in an annular space 20 defined between an outer ring 11 and an inner ring 12. When the one-way clutch is rotated in one direction at the time of transmission of power, by means of relative rotation between the outer ring 11 and the inner ring 12, the sprags 15 act as wedges, whereby the outer ring 11 and the inner ring 12 rotate in an integrated fashion (a locked state). When the retainer 13 is rotated in the opposite direction, the sprags 15 are released from a wedge-like state and perform idle running, thereby interrupting power transmission (an unlocked state). In some cases the retainer consists of two retainers; that is, an outer retainer and an inner retainer. The two retainers are rotated relatively under a locked state and under an unlocked state.

In such a one-way clutch of sprag type, the spring 14 is guided along an inner diameter side of the retainer 13, thereby enabling correct radial positioning of the sprags 15 retained by the spring 14. Tongue-like flaps 14 of the spring 14 usually impart pre-stress (i.e., force) to the sprags 15 toward a direction in which the sprags 15 are to be locked, thus contributing to an engagement characteristic. As mentioned, the tongue-like flaps 14*t* become deformed, as occasion demands, through repeated idle running and engaging actions of the sprags 15. For this reason, the tongue-like flaps that impart pre-stress to the sprags 15 are subjected to repeated stress. In many cases, each of the tongue-like flaps is provided with a rounded section for enhancing the rigidity thereof.

As indicated by chain double-dashed lines shown in FIG. 9, when a rounded section 14*a* of the tongue-like flap 14*t* of the spring is oriented outward, the rounded section 14*a* may interfere with the inner diameter side of the retainer 13, because the spring is usually guided toward the inner diameter side of the retainer 13. When the sprags are subjected to maximum inclination; for example, in the case that the tongue-like flaps 14*t* of the spring are provided respectively with the outward-oriented rounded sections 14*a* or that excessive decentering has arisen between the outer and inner rings, only the extremities of the tongue-like flaps 14*t* fail to act on the sprags, and the rounded sections 14*a* interfere with the sprags 15. As a result, the tongue-like flaps 14*t* fail to exhibit appropriate spring force, thereby deteriorating the engagement characteristic.

FIG. 10 shows the configuration of a related-art one-way clutch. As illustrated, with a view to addressing repeated stress, rounded sections 24*a* are formed on radially inner-diameter sides of respective tongue-like flaps 24*t* of a spring 24 provided along an inner diameter side of a retainer 23, to thereby enhance rigidity of the tongue-like flaps 24*t*. When the rounded sections 24*a* oriented toward an inner diameter are provided, as in the case of the tongue-like flaps 24*t* of the spring 24, there is apprehension that the rounded sections 24*a* may interfere with the adjacent sprags 25 at the time of idle running operation. Hence, large rounded sections cannot be provided.

FIG. 11 shows a one-way clutch constituted by a retainer 23 having a flange section 23*f*, a spring 24, and sprags 25.

In such a one-way clutch, the retainer 23 and the outer ring are rotated synchronously. Hence, in many cases, the retainer 23 is fitted into an outer ring (not shown) while being given interference allowance. To this end, an outer diameter of the retainer 23 (i.e., an outer diameter of the flange 23*f*) is made slightly larger than the inner diameter of a track surface of the outer ring, whereby the retainer 23 is press-fitted to the outer ring. Thus, there is provided a one-way clutch imparted fixing force. By the pressure required when the retainer 23 is press-fitted into an inner peripheral surface of the outer ring, the retainer 23 becomes eccentricity with respect to the outer ring, thereby rendering clearance between the sprags 25 and the pockets of the retainer 23 narrow. In order to avoid such a problem, there has been proposed a method of forming notches 23*c* in the flange 23*f* of the retainer 23 at uniform intervals with reference to a circumferential direction so as to divide the flange 23*f* into pieces of equal parts (as described in Japanese Utility Model Publication No. 43370/1994). Alternatively, a slightly-oval retainer is fixedly pressed into an outer ring such that the outer ring operates along with the retainer in an integrated fashion (Japanese Utility Model Publication No. 10233/1994).

As shown in FIG. 9, the spring 14 is provided on the internal diameter side of the retainer 13 for retaining the sprags 15. Tongue-like flaps 14*t* of the spring 14 force the sprags 15, at all times, toward a direction in which the sprags 15 are to be locked. Since the retainer 13 is to be operated in synchronism with the outer ring 11, when the retainer 13 of slightly ellipse shape is press-fitted into the inner peripheral surface (i.e., track surface) of the outer ring 11, the spring 14 becomes locally deformed toward the radial center because of, particularly, reaction force stemming from press-fitting of the ellipse portion of the retainer 13. Therefore, the force exerted on the sprags 15 by the tongue-like flaps 14*t* of the spring 14 which imparts pre-stress to the sprags 15 is weakened by the local deformation of the spring 14. In areas where the spring 14 is deformed to a great extent, the attitude of the sprags 15 is inclined heavily toward the direction of idle running. When the sprags 15 move from an idle running position to an engagement position, the amount of deformation of the tongue-like flaps 14*t* of the spring 14 becomes greater, thereby rendering the tongue-like flaps 14*t* easy to break. Such breakage in turn induces an engagement failure in a one-way clutch.

SUMMARY OF THE INVENTION

The invention has been conceived to address the foregoing problem and object of the invention it to provide a one-way clutch which prevents rounded sections provided on respective tongue-like flaps of a spring, the flaps imparting pre-stress (force) to the sprags, from interfering with a retainer or the sprags and which achieves a superior engagement characteristic and involves very little fear of deformation and fracture.

Another object is to provide a one-way clutch which, even when interference allowance to be ensured between a retainer and an outer ring becomes large, maintains appropriate spring force, ensures synchronism between the outer ring and the retainer without weakening spring force of tongue-like flaps, and does not entail a cost hike.

In order to solve the aforesaid object, the invention is characterized by having the following arrangement.

(1) A one-way clutch comprising:
  an annular retainer including,
    a plurality of first pockets, and
    a pair of guide sections formed at opposite corners on one side of each first pocket with respect to a circumferential direction thereof, and defining a space therebetween having a first width;
  a spring guided by an inner surface of the retainer, including,
    a plurality of second pockets,
    a plurality of tongue-like flaps projecting to the plurality of second pockets, respectively, and
    a plurality of rounded sections, each of which is formed on the tongue-like flap, projects toward the retainer and has a width smaller than the first width, wherein the rounded section is interposed between the pair of guide sections; and
  a plurality of sprags pivotally provided in the plurality of first and second pockets and forced toward a direction in which the sprag is to be locked by the plurality of tongue-like flaps, respectively.

(2) The one-way clutch according to (1), wherein each of the plurality of sprags includes a recessed section formed on a side thereof which comes into contact with a corresponding tongue-like flap for preventing interference between the sprag and the rounded section when the sprag is inclined with a maximum angle.

(3) The one-way clutch according to (1), wherein the spring includes a pair of annular sections and a plurality of coupling sections interconnecting the pair of annular sections so as to define the plurality of second pockets.

(4) The one-way clutch according to (3), where in the plurality of tongue-like flaps project from the plurality of coupling sections, respectively.

(5) The one-way clutch according to (1), wherein one end and the other end of the spring are superposed each other to form an annular shape.

(6) The one-way clutch according to (5), wherein the second pockets disposed on each of the one end and the other end of the spring are superposed each other.

(7) An one-way clutch comprising:
  an annular retainer including a plurality of pockets and fitted into an outer ring in a state that reaction force of the retainer acting on the outer ring is uneven;
  a spring including a plurality of pockets and provided along an inner side of the retainer so that a portion of the spring where the reaction force of the retainer becomes maximum is made greater in rigidity than the remaining portion of the spring; and
  a plurality of sprags provided in the plurality of pockets of the retainer and the spring.

(8) The one-way clutch according to (7), wherein the portion of the spring where the reaction force of the retainer becomes maximum is made greater in rigidity by superposing one end of the spring on the other end of the spring.

(9) The one-way clutch according to (8), wherein the pocket disposed on each of the one end and the other end of the spring are superposed each other.

(10) The one-way clutch according to (7), wherein the portion of the spring where the reaction force of the retainer becomes maximum is made greater in rigidity than the remaining portion of the spring by hardening.

(11) The one-way clutch according to (7), wherein
  the retainer includes an ellipse flange section fitted into the outer ring, and
  the portion of the spring where the reaction force of the retainer becomes maximum corresponds a portion of the ellipse flange section at a maximum diameter.

DETAILED DESCRIPTION OF PREFERRED EMBODIMENTS

A specific embodiment of the invention will be described hereinbelow by reference to the drawings.

First Embodiment

Figure 1A:
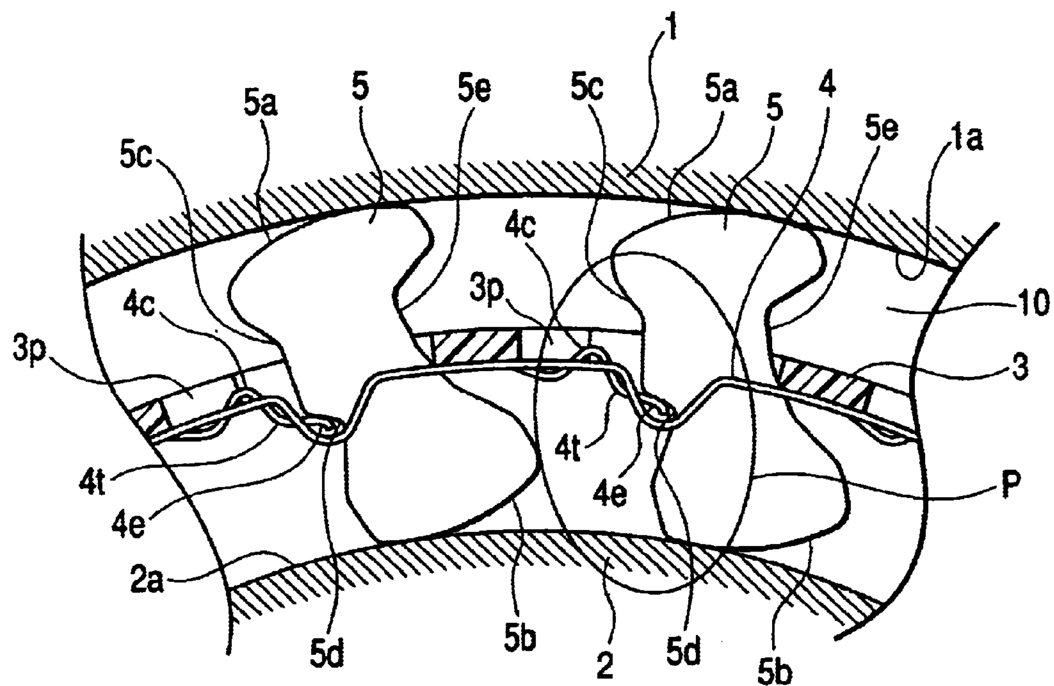
FIG. 1A is a view showing the configuration of a one-way clutch according to the invention; that is, a fragmentary cross-sectional view of the clutch when viewed in the direction orthogonal to an axial direction.
Figure 1B:
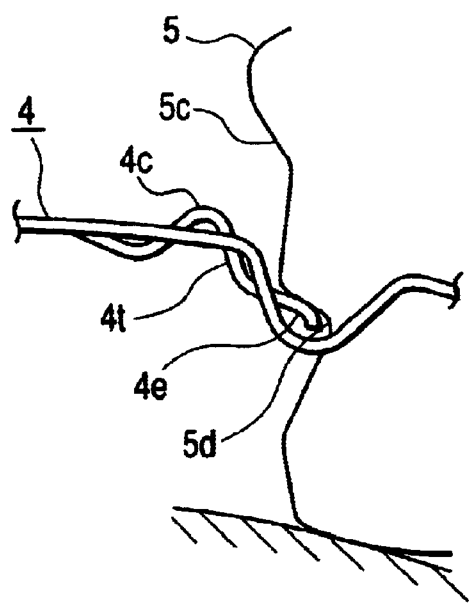
FIG. 1B is an enlarged view of a section P shown in FIG. 1A.
Figure 2A:
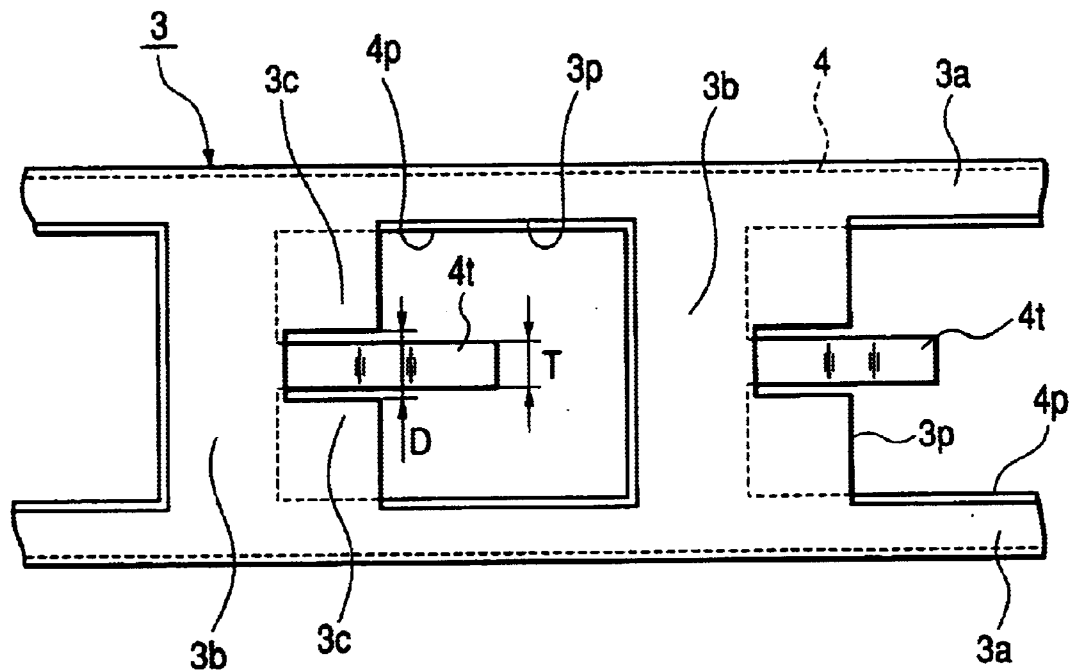
FIG. 2A is a fragmentary plan view of a retainer constituting the one-way clutch and a spring guided by the retainer.
Figure 2B:
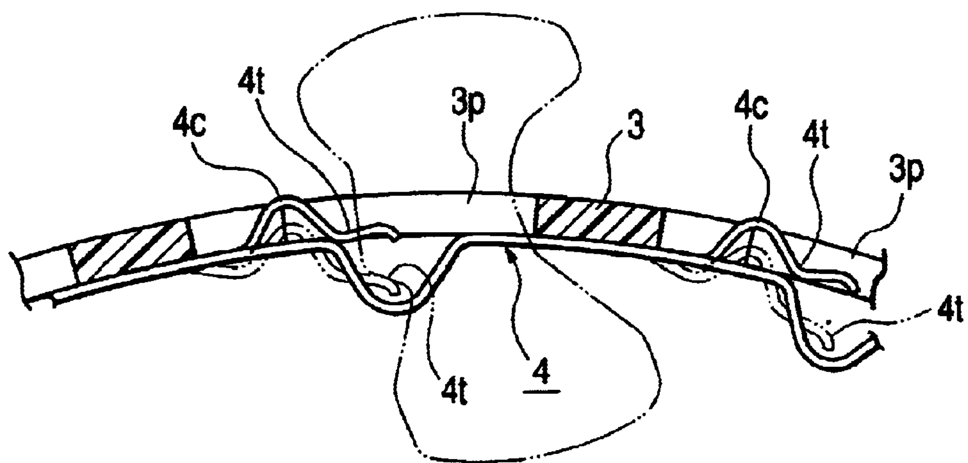
FIG. 2B is a cross-sectional side view of the retainer and the spring.
Figure 3:
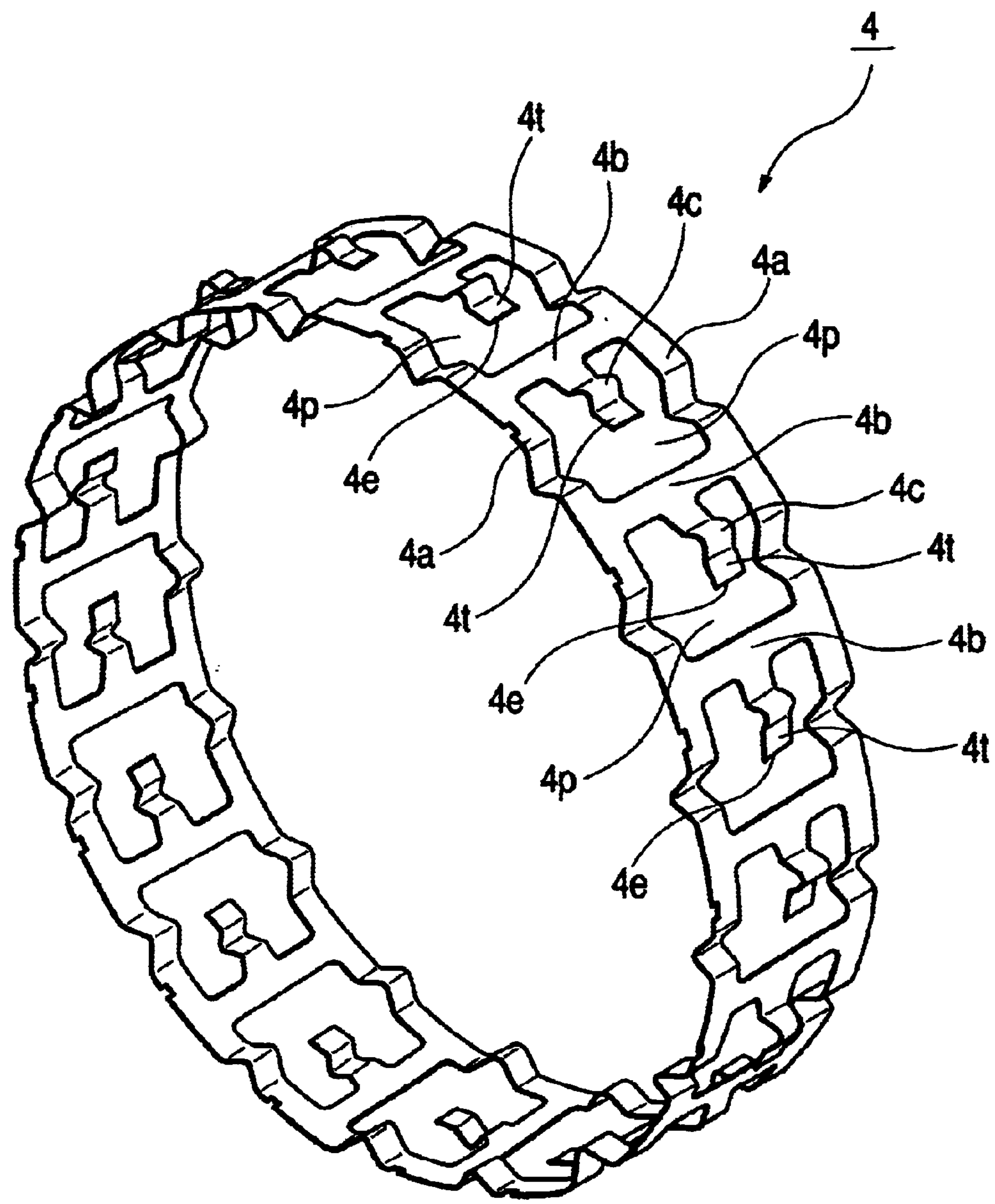
FIG. 3 is a fragmentary perspective view of the spring constituting the one-way clutch of the invention.

FIG. 1A is a view showing the configuration of a one-way clutch according to the invention. The view is a fragmentary cross-sectional view of the clutch when viewed in the direction orthogonal to an axial direction. FIG. 1B is an enlarged view of a section P shown in FIG. 1A. FIG. 2A is a fragmentary plan view of a retainer and a spring, which constitute the one-way clutch. FIG. 2B is a side cross-sectional view of the retainer and the spring. FIG. 3 is a perspective view of the spring. The one-way clutch is constituted by the retainer 3, the spring 4 provided on the inner diameter side of the retainer 3, and the sprags 5 provided in the respective pockets defined between the retainer 3 and the spring 4. The one-way clutch is disposed in an annular space 10 defined between an outer ring 1 and an inner ring 2 and causes the outer ring 1 to engage with or disengage from the inner ring 2. As shown in FIG. 2B, a solid line designates a state in which the spring 4 does not retain the sprags 5, and a chain double-dashed line designates a state in which the spring 4 retains the sprags 5.

Annular sections 3*a* are formed on opposite sides of the retainer 3, respectively. Coupling sections (rung sections) 3*b* are formed at uniform intervals in a circumferential direction between the annular sections 3*a*. Pockets 3*p* are formed between the annular sections 3*a* and the rung sections 3*b*, and the sprags 5 are provided in the respective pockets 3*p*. The spring 4 is guided along the inner diameter side of the retainer 3.

Holes of the pockets 3*p* are formed in the retainer 3, and each hole assumes a convex profile when viewed in cross section (i.e., an upper center of each pocket projects upward so that step portions are provided on opposite sides of the pocket). As will be described later, both corners at one end of each pocket 3*p* of the retainer 3 with respect to a circumferential direction thereof; that is, convex steps (3*c*, 3*c*) act as guide sections (hereinafter called "guide sections 3*c*") for guiding the spring 4 by placing each tongue-like flap 4*t* of the spring in the space between the steps.

Annular sections 4*a* are formed on opposite sides of the spring 4, respectively. Coupling sections 4*b* are formed at uniform intervals in a circumferential direction between the annular sections 4*a*. Pockets 4*p* are defined between the annular sections 4*a* and the rung sections 4*b*. The sprags 5 are placed in the pockets 4*p*, respectively. In other words, the retainer 3 and the spring 4 are substantially overlapped, that is, the annular section 3*a* and the annular section 4*a* are substantially overlapped, the rung section 3*b* and the rung sections 4*b* are substantially overlapped, and the pocket sections 3*p* and the pocket sections 4*p* are substantially overlapped. As mentioned above, the pockets 3*p* of the retainer 3 are each formed so as to assume the convex profile when viewed in cross section. In contrast, the pockets 4*p* of the spring 4 are each formed so as to assume a concave profile when viewed in cross section (i.e., an upper center of each pocket is projected downward, and steps are provided on both sides of the pocket). The portion of the spring 4 projecting downward in the concave hole corresponds to the tongue-like flap 4*t*. The tongue-like flaps 4*t* exert force to the sprags 5 placed in the pockets 3*p*, 4*p*.

As is evident from FIGS. 2A and 2B, the tongue-like flap 4*t* of the spring 4 is located between the guide sections 3*c*, 3*c* of the hole of the pocket 3*p* of the retainer 3 (i.e., in the transverse center of the pocket 3*p*). In this case, the space between the guide sections 3*c* of the pocket 3*p* of the retainer 3 is set so as to become wider than the width T of the tongue-like flap 4*t* of the spring 4. Specifically, the retainer 3 guides the spring 4 while bringing the spring 4 in substantially intimate contact with the inner diameter side of the retainer 3. In this case, the tongue-like flaps 4*t* of the spring 4 are placed in the spaces defined between the guides 3*c* of the respective pockets 3*p*, thereby guiding the spring 4. A rounded section 4*c* is formed on an outer-diameter exterior side of each tongue-like flap 4*t* of the spring 4. By means of the rounded section 4*c*, the tongue-like flap 4*t* is given larger flexural rigidity and higher strength against fatigue or fracture.

An extremity 4*e* of each tongue-like flap 4*t* of the spring 4 is slightly rounded. When the sprays 5 are placed in the respective pockets 4*p* of the spring 4, the extremities 4*e* of the tongue-like flaps 4*t* are brought into contact with smooth recessed sections 5*d* which will be described later and are formed in positions of the sprags 5 close to their inner diameters, thereby forcing the sprags 5 toward a direction in which they are to be locked (see FIG. 1).

A smooth cam surface 5*a* is formed in an outer circumferential surface of each sprag 5 so as to come into contact with the inner circumferential surface 1*a* of the outer ring 1. A smooth cam surface 5*b* is formed on an inner circumferential surface of each sprag 5 so as to come into contact with the outer circumferential surface 2*a* of the inner ring 2. A recessed section 5*c* is formed on the side of the sprag 5 that comes into contact with the tongue-like flap 4*t* of the spring 4 in a cross section with respect to the direction that the sprag 5 is to undergo pivotal movement when the sprag 5 is fitted into a corresponding pocket 4*p* of the spring 4. The recessed section 5*c* prevents interference between the sprag 5 and the rounded section 4*c* of the tongue-like flap 4*t* of the spring 4, which would otherwise be caused when the sprag 5 is subjected to maximum inclination. An indentation 5*d* is formed in an inner diameter side of the recessed section 5*c* of the sprag 5 such that smooth contact arises between the rounded portion of the extremity 4*e* of the tongue-like flap 4*t* of the spring 4 and the recessed section 5*c*. A side surface 5*e* of the sprag 5 opposite the surface which comes into contact with the tongue-like flap 4*t* of the spring 4 is formed into the shape of a dent such that a center of rotation comes to an appropriate position on the sprag 5 when the sprag 5 undergoes pivotal movement.

As has been described in detail, according to a one-way clutch of the invention, a rounded section for mitigating stress is provided on a tongue-like flap of a spring, the flap imparting pre-stress (or force) to a corresponding sprag. The rounded section can prevent occurrence of interference between the tongue-like flap and the sprag or another member of a retainer.

Accordingly, there can be ensured synchronism of the sprags and improvement in the engagement characteristic of the one-way clutch. Further, the rounded section of the tongue-like flap of the spring does not interfere with another member, thereby preventing deformation or fracture.

Second Embodiment

Figure 4:
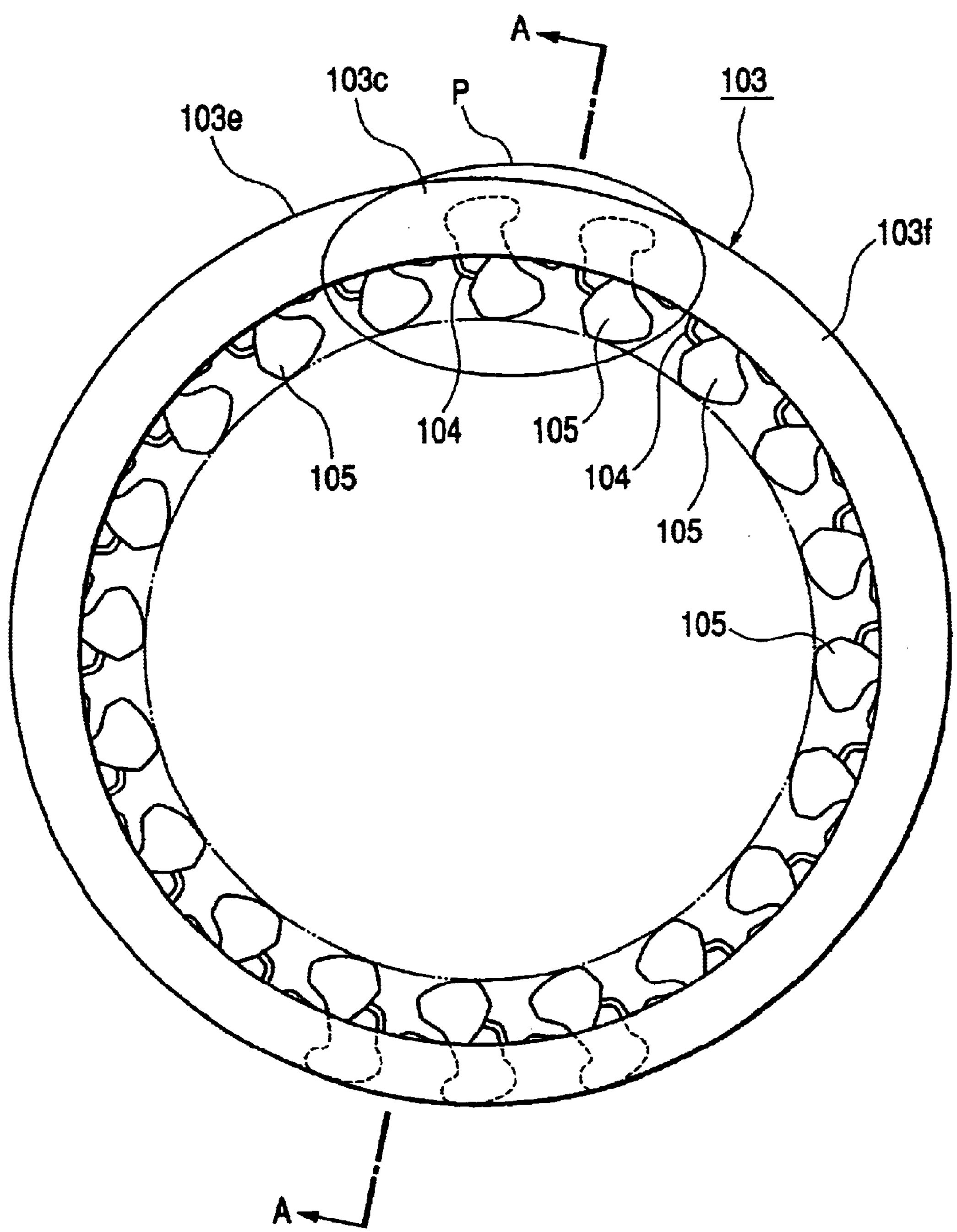
FIG. 4 is a side view of a one-way clutch according to the invention.
Figure 5:
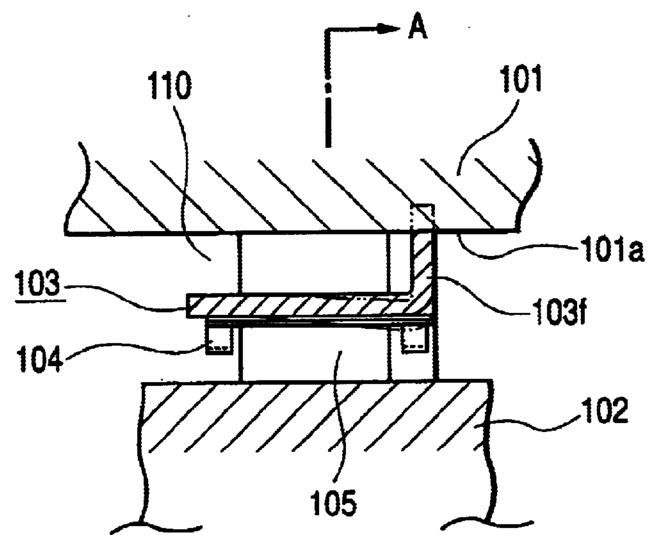
FIG. 5 is a cross-sectional view of the one-way clutch of the invention when viewed along line A—A shown in FIG. 4.
Figure 5:
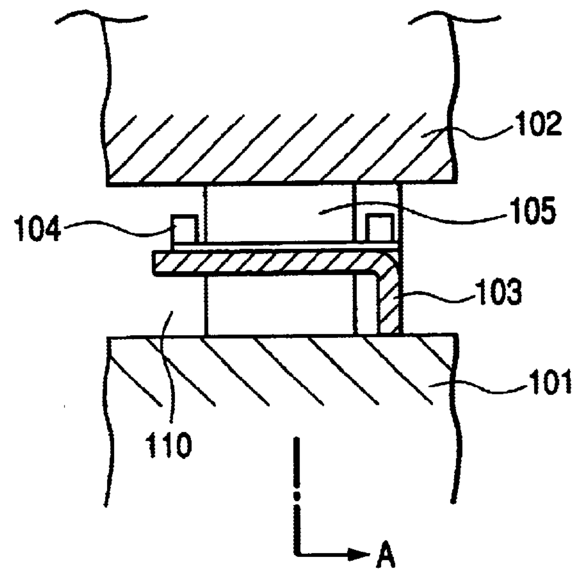
Figure 6:
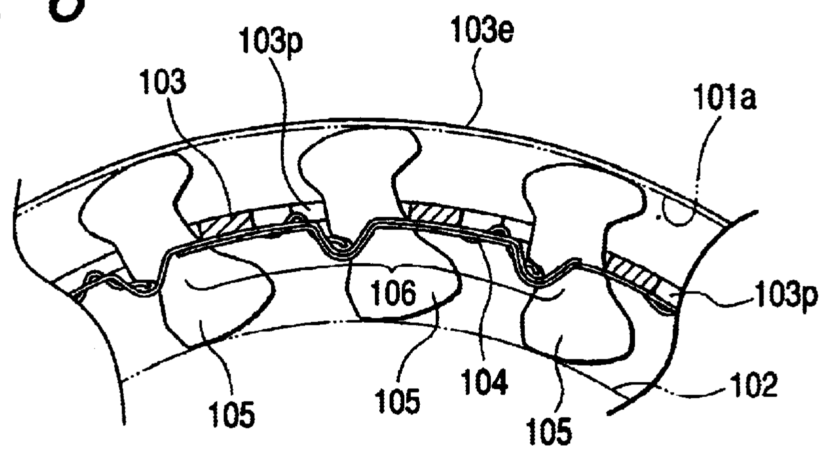
FIG. 6 is an enlarged cross-sectional view of section P shown in FIG. 4, showing the one-way clutch of the invention.
Figure 7:
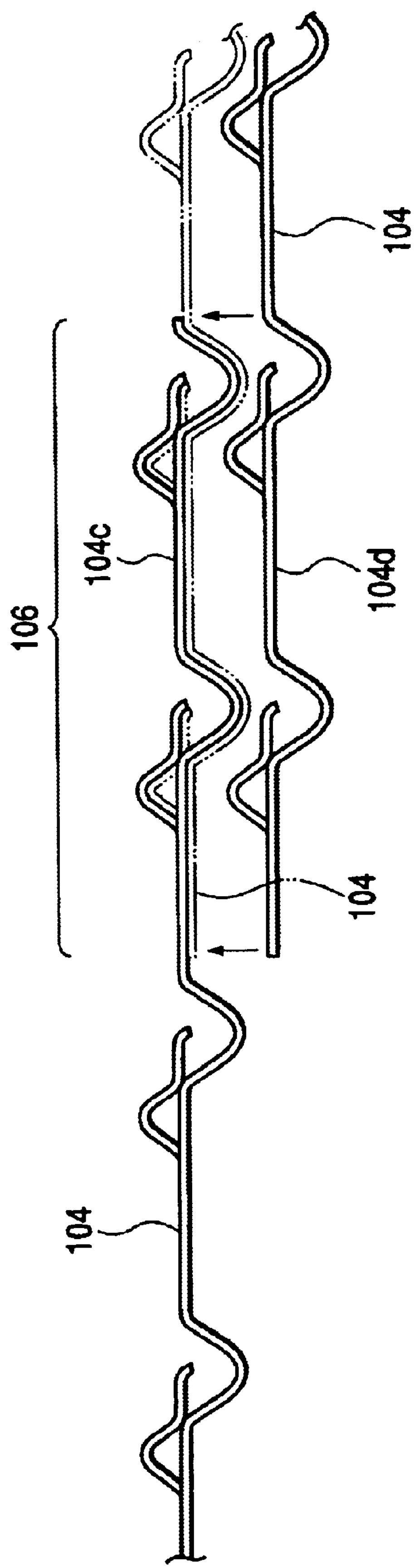
FIG. 7 is an enlarged view of a ribbon spring section constituting the one-way clutch for describing an overlap.

FIG. 4 is a side view of a one-way clutch according to the invention; FIG. 5 is a cross-sectional view taken along line A—A shown in FIG. 4; and FIG. 6 is an enlarged cross-sectional view of a section P shown in FIG. 4. FIG. 7 is an enlarged view of a portion of the spring shown in FIG. 5 for describing an overlap; and FIG. 8 is an overall perspective view of a spring used in the one-way clutch of the invention.

The one-way clutch is constituted by a retainer 103, a spring (e.g., a ribbon spring) 104 arranged so as to follow an inner diameter side of the retainer 103, and sprags 105 fitted into corresponding pockets 103*p* of the retainer 103. The retainer 103 is placed in an annular space 110 defined between an outer ring 101 and an inner ring 102. A flange section 103*f* is formed on one side of the retainer 103. An outer circumferential surface 103*e* of the flange section 103*f* is press-fitted into an inner circumferential surface 101*a* (also called a track surface 101*a*) of the outer ring 101. In order to ensure press-fitting, a portion of the flange section 103*f* is formed into an ellipse shape. The following description is provided for the case where a single retainer 103 is used. The invention can also be applied to a commonly-employed one-way clutch using two retainers; that is, an outer retainer and an inner retainer. Alternatively, flange sections may be formed on opposite sides of the retainer 103, respectively. In this case, one of the flanges is caused to have an outer diameter smaller than the diameter of a small circle.

Figure 8:
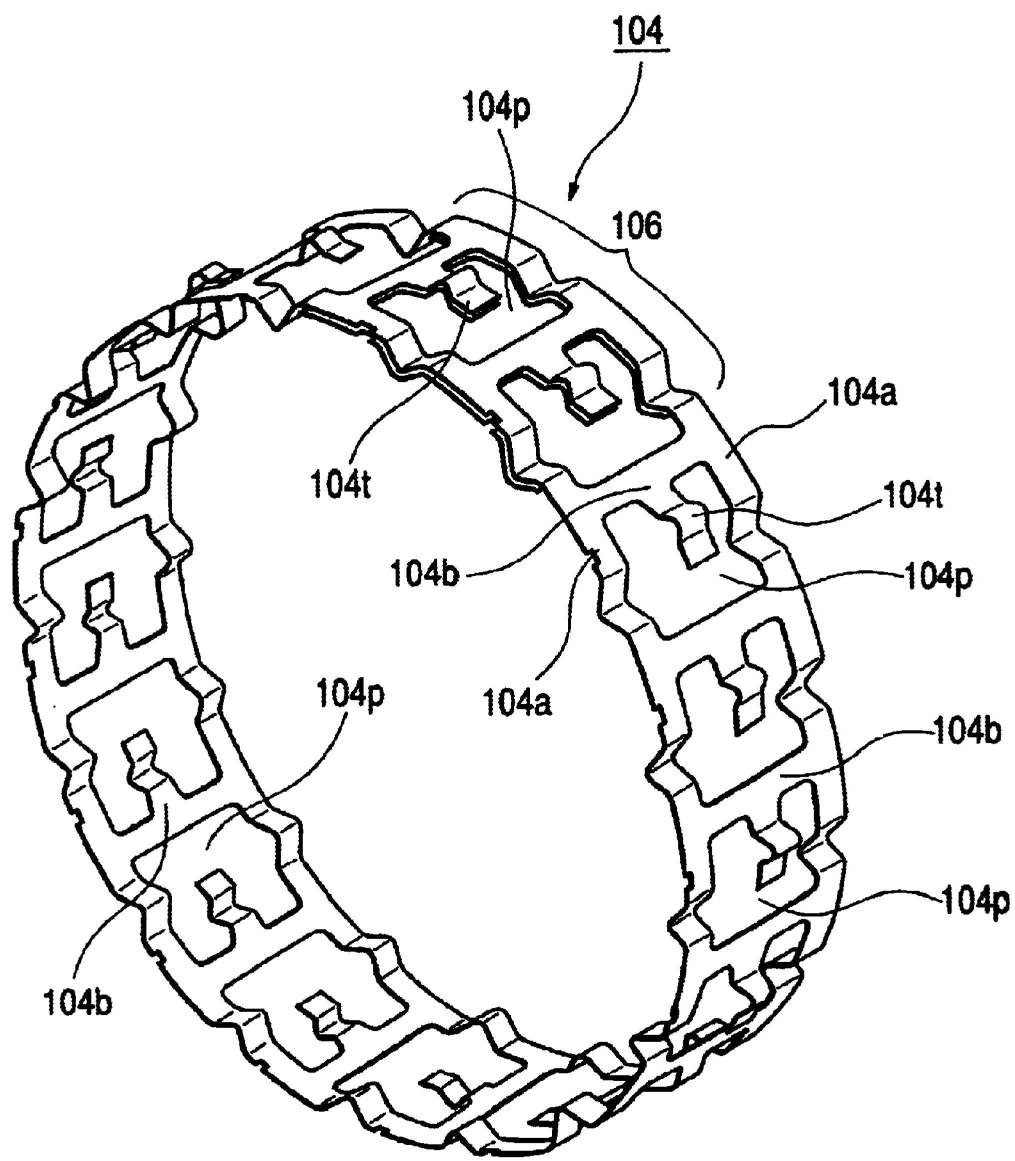
FIG. 8 is an overall perspective view of the ribbon spring constituting the one-way clutch of the invention.
Figure 9:
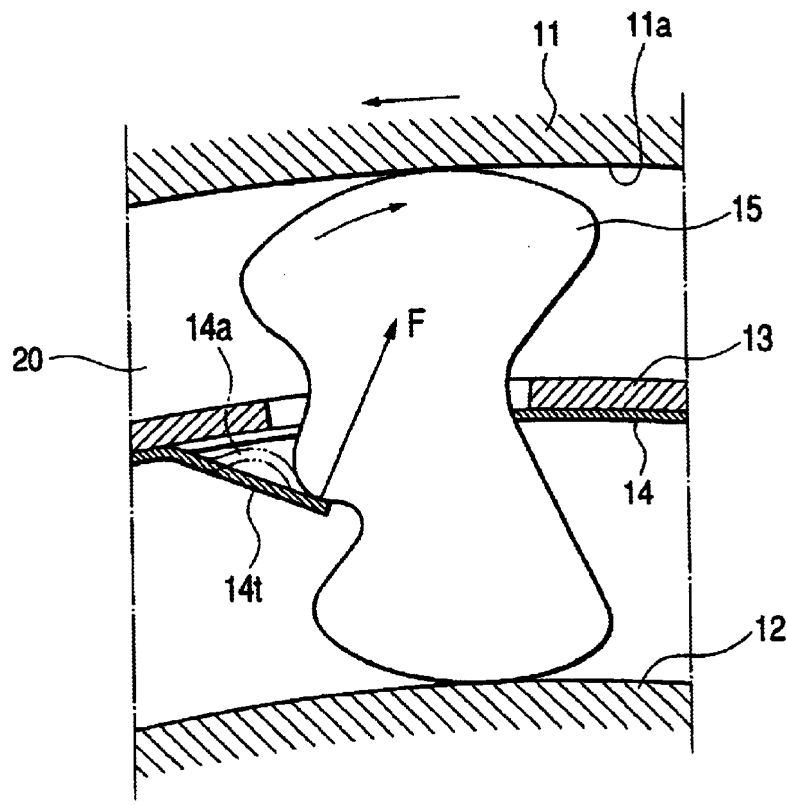
FIG. 9 is a view showing the configuration of a related-art one-way clutch.
Figure 10:
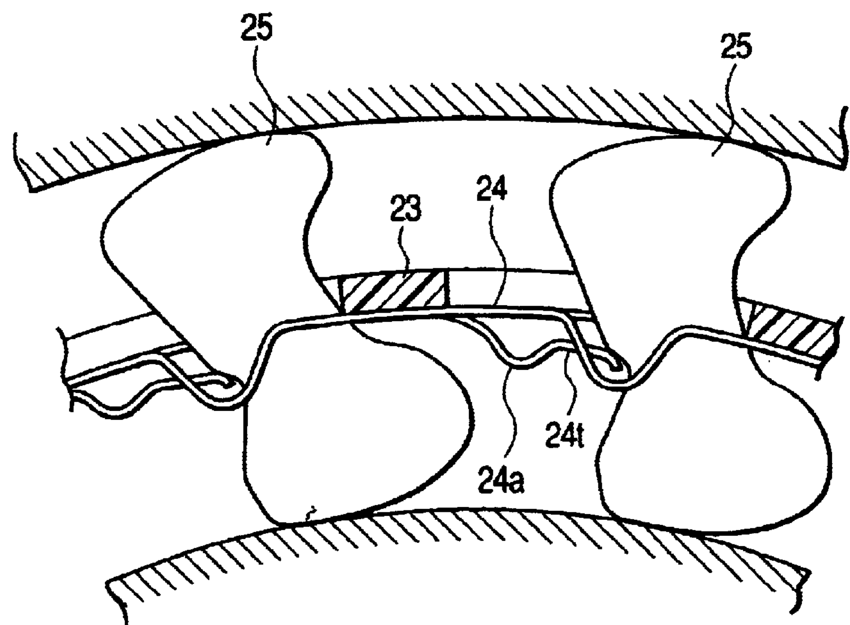
FIG. 10 is a view showing another configuration of a related-art one-way clutch.
Figure 11:
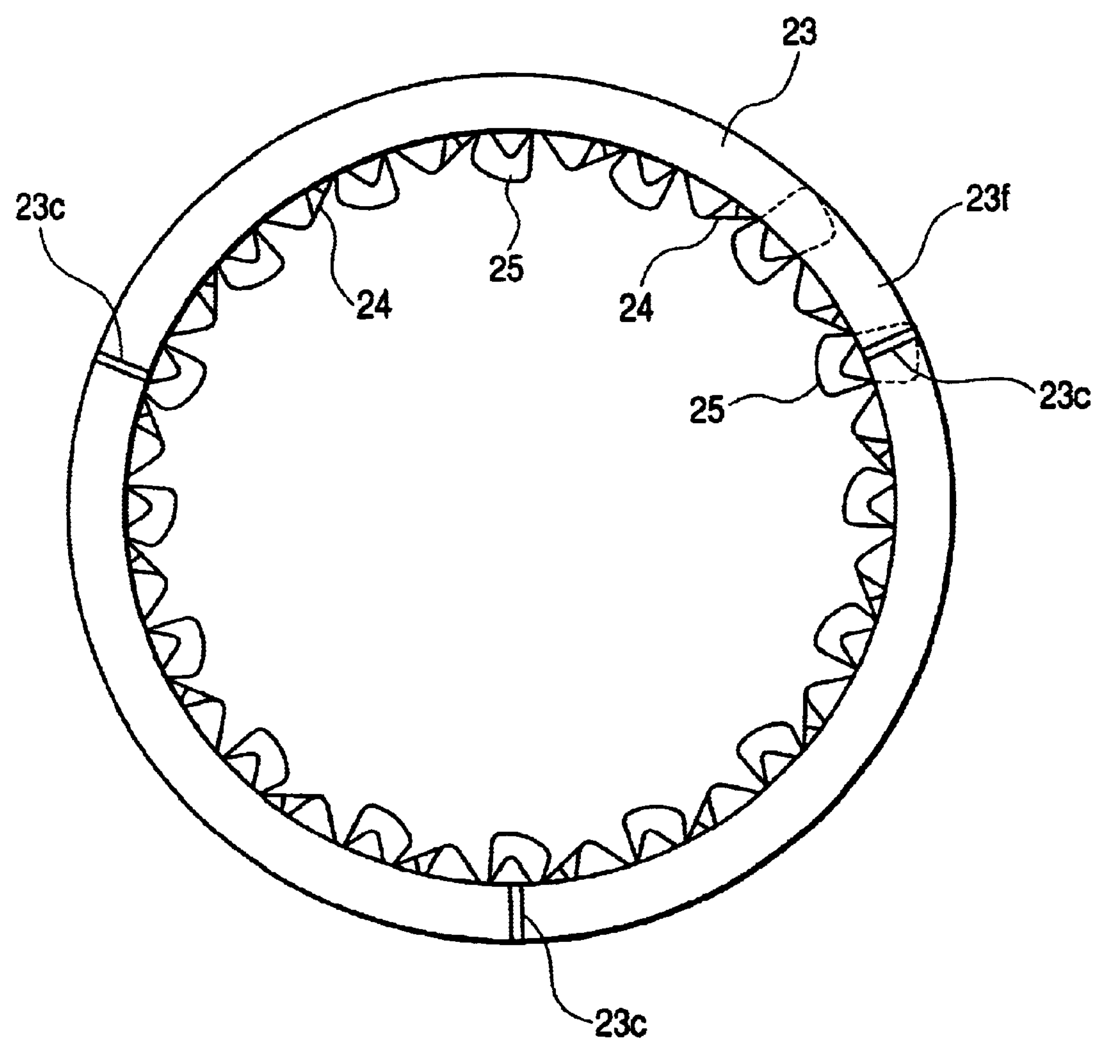
FIG. 11 is an example side view of the related-art one-way clutch.

As shown in FIG. 8, the spring 104 assumes a shape substantially identical with that of the retainer 103. The spring 104 comprises annular sections 104*a* constituting respective sides of the spring 104; coupling sections 104*b* (rung sections) for inter connecting the annular sections 104*a* at given intervals in a circumferential direction; pocket sections 104*p* which are defined by the annular sections 104*a* and the coupling sections 104*b* and in which sprags 105 are to be fitted, respectively; and tongue-like flaps 104*t* which project from the respective coupling sections 104*b* toward the corresponding pockets 104*p*. The spring 104 is formed by means of punching a thin metal plate through press machining and formed into an annular shape. As will be described later, portions of the edges of the annular spring 104 are overlapped with each other, thereby increasing the rigidity of the thus-overlapped portions of the spring 104.

As mentioned above, when the flange section 103*f* of the retainer 103 is press-fitted into the track surface 101*a* of the outer ring 101, an oval portion 103*c* of the retainer 103 designated by section P shown in FIG. 4 is given the largest interference allowance. Therefore, the amount of deformation of this portion of the retainer 103 is subjected to a local increase. In this case, the amount of deformation of the spring 104 provided along the inner diameter side of the retainer 103 usually becomes smaller. Accordingly, the amount of deformation of the tongue-like flaps 104*t* of the spring 104, the flaps forcing the sprags 105 toward a side in which the sprags 105 are to be locked, becomes smaller. Hence, pre-stress exerted on the sprags 5 by the tongue-like flaps 104*t* becomes smaller. As shown in FIGS. 7 and 8, in order to prevent this situation, there is formed a partial overlap section 106 where one end 104*c* of the spring 104 and another end 104*d* of the same are superimposed on each other, thereby enhancing the rigidity (spring force) of the spring 104 (for the sake of explanation of the spring 104, FIG. 7 shows that one end and the other end are spaced away from each other). In this way, when the rigidity (spring force) of the overlap becomes greater, pre-stress to be exerted on the sprags 105 can be ensured even when the amount of deformation of the ellipse portion 103*c* of the retainer 103 has become greater and the amount of deformation of the tongue-like flaps 104*t* of the spring 104 has become smaller. Consequently, the sprags 105 are prevented from being deformed greatly toward the direction of idle running. Even when moving from an idle running position to an engagement position, all the sprags 105 operate synchronously in the usual manner.

The one-way clutch of the invention prevents the sprag 105 from excess leaning toward the direction of free running due to a decrease in the force exerted on the sprags 105 in which the force is produced by displacement of the retainer 103 and the tongue-like flaps 104*t* of the spring 104, the displacement being caused by reaction force produced when the retainer 103 is press-fitted into the track surface 101*a* of the outer ring 101, and the ellipse portion 103*c* are press-fitted into the track surface 101*a* of the outer ring 101. With a view to preventing fatigue of the spring 104, which would otherwise be caused by press-fitting of the ellipse portion 103*c* of the retainer 103, a portion of the spring 104 is given a double structure, thereby enhancing the rigidity of a portion of the spring 104. In order to enhance the rigidity of a portion of the spring 104 in the manner as mentioned above, the rigidity of the portion of the spring may be enhanced by means of locally changing hardening conditions (for the portion of the spring which would be subjected to greater reaction force stemming from press-fitting action), as well as by means of imparting a double structure to a portion of the spring. Furthermore, the shape of a portion of the spring 4 may be changed so as to have greater rigidity. When the portion of the retainer 103 that is given the largest interference allowance is distinguished by utilization of a marking, such as a production symbol provided at the time of press-molding, an overlap in the spring can be fitted to an appropriate position of the retainer 103. Since the spring can be fitted into the retainer without involvement of an assembly error, the marking is convenient.

The one-way clutch according to the invention may be constituted by combing the first embodiment to the second embodiment.

As mentioned in detail, the one-way clutch of the invention can inhibit fatigue of tongue-like flaps and prevent occurrence of an engagement failure, by means of enhancing the spring force of the tongue-like flaps of a ribbon spring located in a position between the retainer and the outer ring, where the largest interference allowance is ensured. Further, the one-way clutch can appropriately enhance spring force without involvement of a cost increase. Further, a conventional marking can be utilized for distinguishing the position of the retainer that is given the largest interference allowance, thereby avoiding a cost increase.

What is claimed is:

1. An one-way clutch comprising:

an annular retainer including a plurality of pockets and fitted into an outer ring in a state that a reaction force of the retainer acting on the outer ring is uneven;

a spring including a plurality of pockets and provided along an inner side of the retainer so that a portion of the spring where the reaction force of the retainer becomes maximum is made greater in rigidity than the remaining portion of the spring; and a plurality of sprags provided in the plurality of pockets of the retainer and the spring.

2. The one-way clutch according to claim 1, wherein the portion of the spring where the reaction force of the retainer becomes maximum is made greater in rigidity by superposing one end of the spring on the other end of the spring.

3. The one-way clutch according to claim 2, wherein the pocket disposed on each of the one end and the other end of the spring are superposed each other.

4. The one-way clutch according to claim 1, wherein the portion of the spring where the reaction force of the retainer becomes maximum is made greater in rigidity than the remaining portion of the spring by hardening.

5. The one-way clutch according to claim 1, wherein the retainer includes an ellipse flange section fitted into the outer ring, and the portion of the spring where the reaction force of the retainer becomes maximum corresponds to a portion of the ellipse flange section at a maximum diameter.

6. A one-way clutch comprising:

an outer ring;

an annular retainer fitted inside the outer ring such that a reaction force is uneven, the annular retainer including a plurality of pockets;

a spring inside the annular retainer and having a portion with a greater rigidity at where the reaction force of annular retainer is at a maximum than the remaining portion of the spring, and having a plurality of pockets; and a plurality of sprags in the plurality of pockets of the annular retainer and the spring.

7. The clutch of claim 6, wherein the portion of the spring having a greater rigidity comprises superposed ends of a ribbon spring.

8. The clutch of claim 6, wherein the portion of the spring having a greater rigidity comprises a portion that is harder than the remaining portion of the spring.

9. The clutch of claim 6, wherein the retainer comprises an ellipse flange section.

10. The clutch of claim 9, wherein the portion of the spring having a greater rigidity corresponds to the position of the flange which has a maximum free diameter.

11. The clutch of claim 6, further comprising an inner ring inside the spring.

12. The clutch of claim 7, further comprising another retainer between the inner ring and the outer ring.

13. The clutch of claim 12, wherein the another retainer comprises an internal flange section having an inside diameter that is less than the outer diameter of the inner ring.

14. The clutch of claim 6, wherein the retainer comprises a marking that indicates where the reaction force is at a maximum.

* * * * *